US011653266B2

(12) United States Patent
Idan et al.

(10) Patent No.: US 11,653,266 B2
(45) Date of Patent: May 16, 2023

(54) DEVICE AND METHOD FOR DETECTING AND MITIGATING DIGITAL DATA NETWORK CONGESTION

(71) Applicant: Huawei Technologies Co., Ltd., Shenzhen (CN)

(72) Inventors: Ofer Idan, Hod Hasharon (IL); Nir Drori, Mazkeret Batia (IL); Amnon Cohen Tidhar, Munich (DE); Zhigang Huang, Boulogne Billancourt (FR); Eitan Bar, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 16/859,209

(22) Filed: Apr. 27, 2020

(65) Prior Publication Data
US 2020/0260327 A1 Aug. 13, 2020

Related U.S. Application Data

(63) Continuation of application No. PCT/EP2017/077416, filed on Oct. 26, 2017.

(51) Int. Cl.
*H04W 28/08* (2009.01)
*H04W 24/08* (2009.01)
(Continued)

(52) U.S. Cl.
CPC ....... *H04W 28/0983* (2020.05); *H04W 24/08* (2013.01); *H04W 28/0268* (2013.01); *H04W 88/08* (2013.01)

(58) Field of Classification Search
CPC ............. H04W 28/0983; H04W 24/08; H04W 28/0268; H04W 88/08; H04L 47/32; H04L 47/24; H04L 47/2441; H04L 47/26
See application file for complete search history.

(56) References Cited

U.S. PATENT DOCUMENTS 7,760,642 B2   7/2010 Plamondon
9,887,921 B2 * 2/2018 Thyni ................. H04W 36/125
11,252,607 B2 * 2/2022 Sevindik ........... H04W 28/0983
(Continued)

FOREIGN PATENT DOCUMENTS

CN   101741752 A   6/2010
CN   101938404 A   1/2011
(Continued)

OTHER PUBLICATIONS

Jyothish, J.K., et al., "An enhanced router based queuing policy providing better fairness to real-time data transfers in Internet", 2015 International Conference on Circuits, Power and Computing Technologies [ICCPCT—2015], IEEE, XP033175640, Mar. 19, 2015, pp. 1-6.
(Continued)

*Primary Examiner* — Abdullahi Ahmed
(74) *Attorney, Agent, or Firm* — Conley Rose, P.C.

(57) ABSTRACT

An access point (AP) device comprising a controller configured to monitor bandwidth allocated by the AP device to a plurality of data flows directed to a plurality of wireless clients using a supported AP device, receive from the supported AP device a message indicating a degradation of a quality of service (QoS) level of the supported AP device, and adapt, in response to the message, a bandwidth allocated to a data flow which is forwarded to the supported AP device.

20 Claims, 4 Drawing Sheets

(51) Int. Cl.
*H04W 28/02* (2009.01)
*H04W 88/08* (2009.01)

(56) References Cited

U.S. PATENT DOCUMENTS

| | | | |
|---|---|---|---|
| 2008/0225721 A1* | 9/2008 | Plamondon | H04L 47/10 370/252 |
| 2010/0103820 A1* | 4/2010 | Fuller | H04W 48/06 370/236 |
| 2011/0274121 A1 | 11/2011 | Xun et al. | |
| 2012/0051216 A1* | 3/2012 | Zhang | H04W 28/0289 370/230 |
| 2014/0092731 A1* | 4/2014 | Gupta | H04W 24/10 370/229 |
| 2017/0070543 A1* | 3/2017 | Balasubramanian | H04W 8/082 |
| 2018/0309676 A1* | 10/2018 | Iordache | H04L 47/29 |
| 2018/0337862 A1* | 11/2018 | Sharma | H04L 43/0829 |
| 2019/0268797 A1* | 8/2019 | Pang | H04L 47/125 |
| 2020/0412656 A1* | 12/2020 | Park | H04W 28/0983 |
| 2022/0053373 A1* | 2/2022 | Yamawaki | H04W 28/0942 |

FOREIGN PATENT DOCUMENTS

| | | |
|---|---|---|
| CN | 102137438 A | 7/2011 |
| CN | 102138301 A | 7/2011 |
| CN | 104113919 A | 10/2014 |
| CN | 104394093 A | 3/2015 |
| CN | 104620640 A | 5/2015 |
| WO | 2009155031 A2 | 12/2009 |

OTHER PUBLICATIONS

IEEE Std 802.11, "Part 11: Wireless LAN Medium Access Control (MAC) and Physical Layer (PHY) Specifications," IEEE Computer Society, 3534 pages.

Berger, E., et al "Frame Marking RTP Header Extension," draft-ietf-avtext-framemarking-03, Oct. 31, 2016, 10 pages.

Berger, E., et al., "Frame Marking RTP Header Extension," draft-ietf-avtext-framemarking-05, Jul. 3, 2017, 11 pages.

Zheng, W., "Research on Cross-Layer Adaptive Video Transmission in IEEE802.11e Wireless Networks," 2015, 1 pages (abstract).

* cited by examiner

400

| 401 Flow ID | |
|---|---|
| 402 Drop Level Value | 403 Queue Occupancy |

FIG. 3

DEVICE AND METHOD FOR DETECTING AND MITIGATING DIGITAL DATA NETWORK CONGESTION

CROSS-REFERENCE TO RELATED APPLICATIONS

This application is a continuation of International Patent Application No. PCT/EP2017/077416 filed on Oct. 26, 2017, which is hereby incorporated by reference in its entirety.

BACKGROUND

The present disclosure, in some embodiments thereof, relates to a digital data communication, e.g., a local area network (LAN) and, in particular, but not exclusively, to a wireless LAN (WLAN).

A network hub is a network hardware device for connecting multiple network devices together and making the multiple network devices act as a single network segment. In an Ethernet LAN a network hub may be a repeater or a switch. In a WLAN a hub may be an access point (AP). An AP is a networking hardware device that allows a device based on an Institute of Electrical and Electronics Engineers (IEEE) 802.11 standard protocol (i.e., WI-FI) to connect to a wired network. A relay station (RS) is a network device that relays a message received on an input of the RS to one or more outputs of the RS. A client is a device that has the capability to use the digital data communication network, for example a laptop computer, a desktop computer, a smart television, a video set-top-box (STB), a tablet computer, or a phone. In wireless networking a client may be an AP. In order to increase network coverage and/or network capacity, some digital networks connect multiple hubs in a cascade. For example, a WLAN may comprise multiple APs connected in a cascade to create a multi-hop WI-FI network. In such a network each client in the WI-FI network may be connected to one of the multiple APs and each of the APs may deliver messages to one or more clients directly connected to the AP. In addition, in such a network one or more of the multiple APs acts as an RS, relaying one or more messages received on one input of the RS to another AP of the multiple APs, for the purpose of delivering the one or more messages to a client not directly connected to the RS.

In some digital communication networks one of the hubs is a gateway, connecting the LAN to a wide area network (WAN). As used henceforth, the term home gateway (HGW) is used to mean a gateway AP used to connect a LAN to a WAN. In a WLAN, the HGW is used to connect the WLAN to a WAN.

A device connected to a LAN may receive digital data from a WAN via a HGW connecting the LAN to the WAN. In a WLAN, a client in the WLAN may receive digital data from the WAN via the HGW. In a WLAN having multiple APs connected in a cascade, digital data arriving from the WAN for a destination client may be relayed to one or more of the multiple APs in order to be delivered to the destination client.

SUMMARY

It is an object of the present disclosure to provide a device and a method for a digital data communication network.

The foregoing and other objects are achieved by the features of the independent claims. Further implementation forms are apparent from the dependent claims, the description and the figures.

A first aspect of the present disclosure suggests an AP device. The AP device comprises a controller configured to monitor bandwidth allocated by the AP device to a plurality of data flows directed to a plurality of wireless clients including a supported AP device. The controller receives from the supported AP device a message indicative of a degradation of a quality of service (QoS) level provided by the supported AP device. In response to the message, the controller adapts a bandwidth allocated to at least one of the plurality of data flows which is forwarded to the supported AP device.

A second aspect of the present disclosure suggests a method of allocating bandwidth to a plurality of data flows directed to a plurality of wireless clients. The plurality of wireless clients include a supported AP device. The method comprises monitoring bandwidth allocated by the AP device to the plurality of data flows, receiving from the supported AP device a message indicative of a degradation of a QoS level provided by the supported AP device, and in response to the message, adapting a bandwidth allocated to at least one of the plurality of data flows which is forwarded to the supported AP device. Adapting bandwidth at an early stage of the data flow may reduce congestion and packet loss further down the network.

A third aspect of the present disclosure suggests an AP device. The AP device comprises a controller configured to receive from an originating AP a plurality of data flows directed to a plurality of wireless clients. For each of the plurality of data flows, the controller monitors a QoS level of providing the respective data flow to one of the plurality of wireless clients by the AP device. The controller is also configured to detect a degradation in the QoS level allocated to at least one of the plurality of data flows. In response to the degradation, the controller is configured to forward to the originating AP a message indicative of the degradation to allow the originating AP to adapt a bandwidth allocated to the at least one data flow.

With reference to the first and second aspects, in a further embodiment, the plurality of wireless clients comprises a plurality of supported APs, the AP device is an HGW AP, and the supported AP is one of the plurality of supported APs. An HGW facilitates connecting the plurality of wireless clients (e.g. AP stations or client devices) to a WAN.

With reference to the first and second aspects, or the first possible implementation of the present disclosure, in a further embodiment the controller is configured to identify each one of the plurality of data flows according to at least some of the following parameters: a source Internet Protocol (IP) address, a destination IP address, a source port, a destination port, and a Protocol. Optionally, the controller is configured to perform a classification of each one of the plurality of data flows according to the parameters. Optionally the bandwidth is allocated to at least one of the plurality of data flows according to the respective classification. Identifying and classifying each of the plurality of data flows allows allocating different bandwidth to each of the plurality of data flows.

With reference to the first and second aspects, in a further embodiment, the controller is configured to maintain a plurality of queues each for one of the plurality of data flow. The controller adapts the bandwidth allocated to at least one of the plurality of data flows by adapting a management of the plurality of queues according to data extracted from the message. Queues are a convenient method of allocating different bandwidth to different data flows.

With reference to the first and second aspects, in a further embodiment, the message comprises a drop level indication indicative of a drop level value selected from a range of values. The bandwidth is adapted based on the level indication. Optionally, the controller is configured to assign a drop level threshold value to each drop level value of the range of values and the bandwidth is adapted based on the threshold value.

With reference to the first and second aspects, in a further embodiment, the plurality of data flows are a plurality of video streams. Optionally, the controller adapts the bandwidth allocated to the at least one data flow by dropping a droppable packet. Optionally, the controller adapts the bandwidth allocated to the at least one data flow by dropping a complete video frame. Early dropping of a droppable packet or a complete video frame of a video stream may limit a degradation in a user's viewing experience.

With reference to the first and second aspects, in a further embodiment, the controller is configured to tag each one of the plurality of data flows with a flow identifier (ID). Uniquely identifying a data flow allows different bandwidth adaptations to different data.

With reference to the first and second aspects, in a further embodiment, the controller is configured to receive from the plurality of supported APs at least two messages, wherein each message is indicative of a degradation of a QoS level provided by a supported AP device from the plurality of the supported APs, in response to the at least two messages, adapt a bandwidth allocated to at least one of the plurality of data flows according to the message indicative of the highest drop level value. By selecting a message with the highest drop level value, guarantees the order of processing the bandwidth adaptation when receiving at least two messages from the plurality of supported APs.

With reference to the third aspect, in a further embodiment, the controller is configured to monitor the QoS level by monitoring a queue occupancy level of each of the plurality of data flows in a plurality of queues. A congested queue may be a useful indication that a QoS level is degraded.

A fourth aspect of the disclosure suggests a computer program product comprising computer readable code instructions which, when run in a computer will cause the computer to perform the method according to any one of the embodiments of the second aspect of the disclosure.

A fifth aspect of the disclosure suggests a computer readable storage medium comprising computer program code instructions, being executable by a computer, for performing the method according to any one of the embodiments of the second aspect of the disclosure when the computer program code instructions runs on a computer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 3 is a schematic illustration of part of an exemplary indication message, according to some embodiments of the present disclosure.

DETAILED DESCRIPTION

Figure 1:
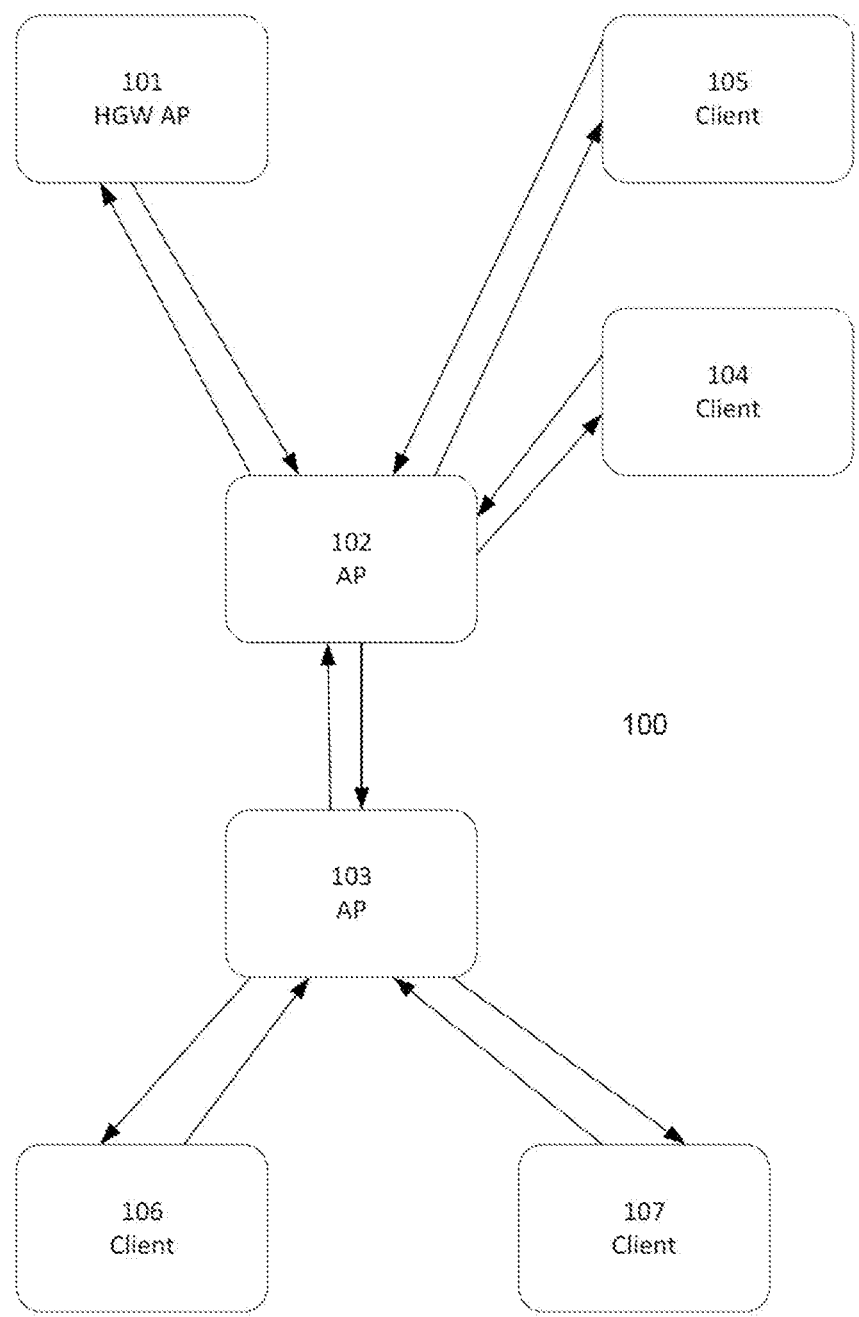
FIG. 1 is a schematic block diagram of an exemplary network, according to some embodiments of the present disclosure.

The present disclosure, in some embodiments thereof, relates to a local area digital data communication network (i.e., LAN) and, in particular, but not exclusively, to a WLAN.

Henceforth, the terms "data traffic" and "traffic" are used interchangeably and refer to one or more data packets on a data communication network.

As used herein, the term "a data flow" means a consecutive sequence of data packets from a source computer to a destination, which may be an identified client, a multicast group, or a broadcast domain.

Henceforth, the term "network" is used to mean a digital data communication network.

The following description focuses on embodiments where the present disclosure is used in a WLAN. However, the present disclosure is not limited to such embodiments and may be used in networks using other physical media such as Ethernet. In addition, the following description focuses on embodiments where the WLAN is used to distribute one or more digital video streams, however the present disclosure is not limited to such embodiments and may be used in networks distributing other digital data streams, for example high speed file transfers.

Network congestion in data networking refers to a condition where a network node is carrying more data than it has resources to handle, that is the network node cannot store and deliver the data in a timely manner. Some possible results of network congestion are increased latency in delivering data to a destination and loss of one or more data packets, i.e. failure to deliver one or more data packets to the destination. For some applications, for example when delivering a digital video stream, network congestion may result in choppy video playback, i.e. video playback with inconsistent frame rate, and playback interruptions for buffering, causing a degraded viewing experience. This is particularly exacerbated when video data packets are dropped arbitrarily, without consideration of the way the video stream is encoded and compressed. When some frames of a video stream are assembled into a group of pictures (GOP) and are encoded using data from previous frames in the GOP, or using data from previous and forward frames in the GOP, the loss of a single frame may result in a failure to decode the entire GOP comprising the lost frame.

Some video streaming protocols, for example multicast video streams, use unreliable transport protocols such as User Datagram Protocol (UDP) to deliver at least one data flow, where there is no mechanism built in to the transport protocol to guarantee delivery of all packets of the at least one data flow. Some applications using a reliable transport protocol, for example Transmission Control Protocol (TCP), do not need to recover from a failure to deliver one or more packets of a data flow as the reliable transport protocol detects the failures to deliver the one or more data packets and retransmits the one or more undelivered packets such that the applications receives all data packets of the data flow in correct order. However, the retransmission of packets may cause application interruptions for buffering the data flow. Playback of a video stream using a reliable transport protocol may not be choppy, but may suffer interruptions for buffering. In contrast, when an unreliable transport protocol is used to transmit a data flow, an application receiving the data flow may implement means to recover from undelivered packets, sometimes impacting an experience of a user using the application. The degraded viewing experience of video playback described above, where video playback is choppy due to loss of one or more data packets of a video stream, is a possible consequence when delivering a video stream using an unreliable transport protocol.

A wireless network may be susceptible to network congestion due to air interference and limited AP memory and computation resources. Using a cascade of APs increases a probability of loss, as each AP may become congested independently of other APs in the WLAN, causing distributed, non-synchronized, packet losses which reduce a user's quality of experience.

As used herein, the term "backhaul air interface" refers to a part of the network connecting one or more APs in a cascade, and a "backhaul stream" is a stream of data delivered on the backhaul air interface. Late dropping of one or more data packets by an AP, in the cascade of APs, not immediately connected to the HGW, results in non-optimal use of the backhaul air interface, using bandwidth at the beginning of the cascade for one or more data packets that are dropped later in the cascade and do not reach the data's destination, thus reducing an amount of data packets delivered on at least part of the backhaul air interface that are delivered to a client.

The present disclosure, in some embodiments thereof, facilitates early dropping of traffic, for the purpose of controlling congestion, by notifying an AP at the beginning of a cascade of APs about congestion detected in one or more of the APs further down the cascade of APs and in response to the notification dropping traffic by the AP at the beginning of the cascade, before the traffic is delivered on the backhaul air interface. Optionally, the AP at the beginning of the cascade is an HGW. A hop is a connection between two APs. One AP is considered closer to the beginning of the cascade than a second AP when a first amount of hops between the HWG and the one AP is less than a second amount of hops between the HWG and the second AP. In some embodiments of the present disclosure, an AP identifies network congestion by detecting a degradation in a QoS level of providing one or more data flows to one or more clients and sends the HGW a message indicative of the detected degradation. In response to the message, in these embodiments the HGW adapts a bandwidth allocated to the one or more data flows. In these embodiments, the adapted bandwidth may reduce congestion in one or more APs in the WLAN, preventing the one or more APs from dropping data packets of the one or more data flows. As a result, one or more clients receiving the one or more data flows may experience smooth reception of the one or more data flows. When the one or more data flows are of a video stream, the one or more clients receiving the video stream may receive a video stream that may be rendered smoothly, with a significantly consistent frame rate despite some lost frames, providing an improved quality of experience to a user compared to a video stream with an inconsistent frame rate. In addition, the backhaul air interface is not used for packets that are later dropped, increasing overall efficiency of the backhaul air interface's use by increasing an amount of packets delivered on at least part of the backhaul air interface that are delivered to a client. Efficient use of the backhaul air interface allows reducing costs of APs, requiring less storage and less computing resources.

Optionally, after the HGW adapts the bandwidth allocated to the one or more data flows, the AP detects an improvement in the QoS level of providing the one or more data flows to the one or more clients and sends the HGW a message indicative of the detected improvement for the purpose of the HGW again adapting the bandwidth allocated to the one or more data flows.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a LAN, a WAN and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary network 100, according to some embodiments of the present disclosure. In these embodiments, the network 100 comprises one or more APs 101, 102 and 103, and one or more clients 104, 105, 106 and 107. The one or more APs are optionally connected in a cascade, such that AP 101 is connected to AP 102, and AP 102 is additionally connected to AP 103. When network 100 is a WLAN, the one or more APs are connected using one or more WI-FI connections such that network 100 operates as a single network segment. Each of the one or more clients is connected to one of the one or more APs. For example, clients 104 and 105 may be connected to AP 102, and clients 106 and 107 may be connected to AP 103. When network 100 is a WLAN, the one or more clients are connected to the one or more APs using the one or more WI-FI connections. Optionally, AP 101 is an HGW, connecting network 100 to a WAN (not shown). Traffic received from the WAN by HGW AP 101 is optionally forwarded to clients 104, 105, 106 and 107 by sending the traffic to AP 102. Optionally, AP 102 forwards traffic directed to client 104 or client 105 to the respective destination client. Optionally, AP 102 forwards traffic directed to client 106 or client 107 to AP 103, that in turn optionally forwards the traffic received from AP 102 to the respective destination client.

When AP 103 becomes congested and drops some network traffic, bandwidth on AP 102 is wasted as some of the traffic delivered by AP 102 does not reach its end destination.

In order to control congestion, in some embodiments of the present disclosure network 100 implements the following optional method for allocating bandwidth to a plurality of data flows directed to a plurality of client.

Figure 2:
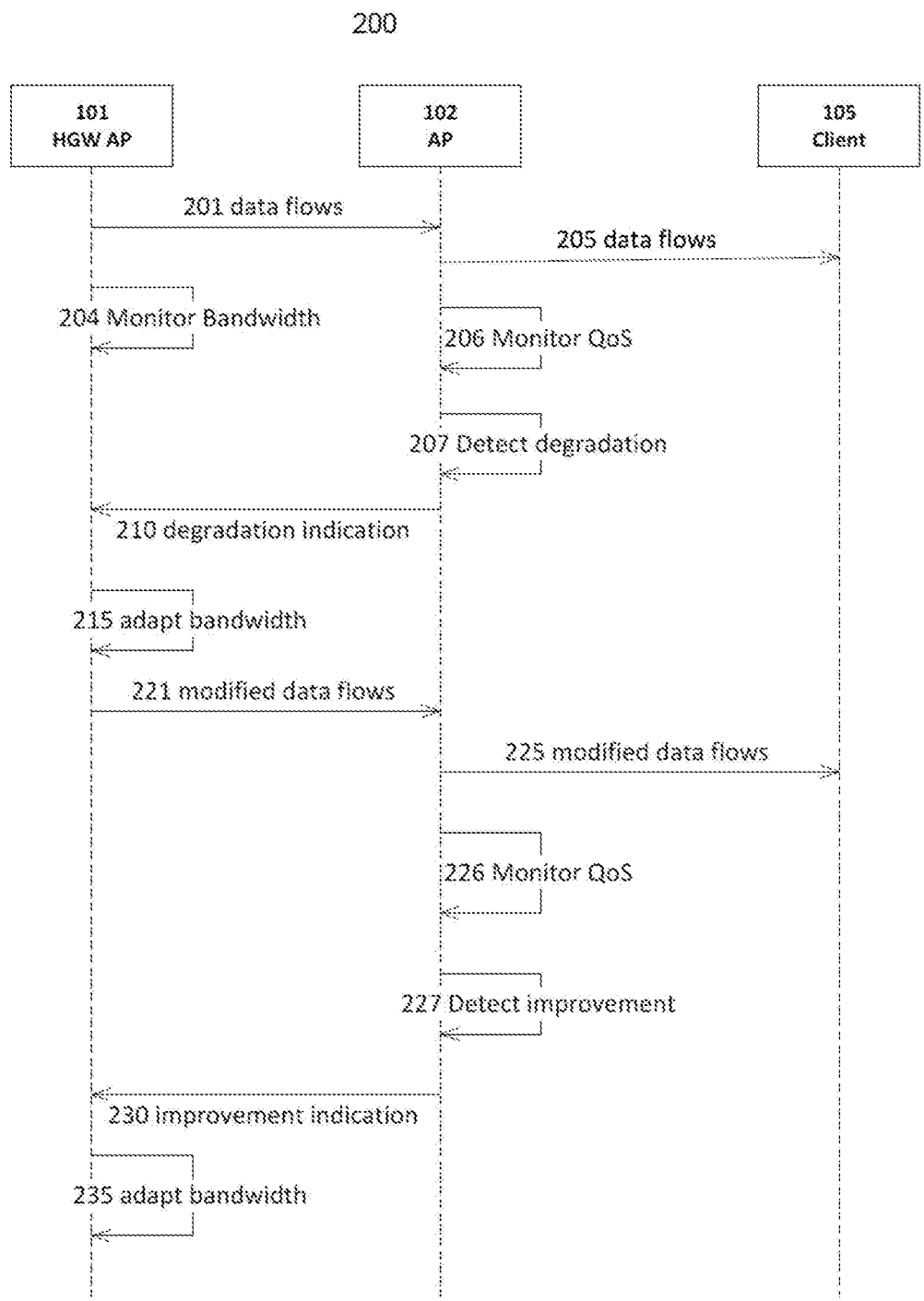
FIG. 2 is a sequence diagram of an optional flow of operations, according to some embodiments of the present disclosure.

Reference is now also made to FIG. 2, showing a sequence diagram of an optional flow of operations 200, according to some embodiments of the present disclosure. In such embodiments, supported AP 102 receives in 201 a plurality of data flows sent from originating AP 101 directed to a plurality of clients, for example a client 105. When network 100 is a WLAN client 105 may be a wireless client that is connected to AP 102 using a WI-FI connection. Optionally, at least some of the plurality of data flows are a plurality of video streams. Optionally, each of the plurality of data flows is identified according to one or more data flow parameters. Examples of a data flow parameter are a source IP address, a destination IP address, a source port, a destination port and a protocol type. Optionally, each of the plurality of data flows is identified by the 5 previously listed data flow parameters, known in the art as a 5-tuple. Optionally, in 204 originating AP 101 monitors bandwidth that AP 101 allocates to the plurality of data flows. Normally, in 205 the plurality of data flows directed to the client 105 via the AP 102. Optionally, in 206 supported AP 102 monitors a QoS level of providing the plurality of data flows to client 105. Monitoring the QoS level may comprise monitoring an amount of dropped data packets directed to client 105 in an identified time interval. Optionally, AP 102 maintains a plurality of queues, each queue for one of the plurality of data flows. In such embodiments, monitoring the QoS level may comprise monitoring a queue occupancy level of each of the plurality of queues. A queue occupancy level is optionally indicated by an amount of packets on the queue, an amount of data bytes on the queue, a percentage of the queue's maximum amount of packets on the queue, or a percentage of the queue's maximum amount of data bytes on the queue.

In 207, AP 102 optionally detects a degradation in the QoS level of at least one of the plurality of data flows, for example by detecting the amount of dropped data packets exceeds a threshold amount of dropped data packets in the identified time interval. Another example of detecting a degradation in QoS level is by detecting a queue occupancy level exceeds a high watermark occupancy level. In response to detecting the degradation, in 210 AP 102 optionally sends originating AP 101 a message indicative of the detected degradation.

Reference is now made also to FIG. 3, showing a schematic illustration of part of an exemplary indication message 400, according to some embodiments of the present disclosure. In such embodiments, the indication message 400 is addressed to the originating AP 101, and comprises a flow ID 401 uniquely identifying the data flow for which AP 102 detected a degradation in the QoS level. When QoS level degradation is detected according to a queue occupancy level, the indication message 400 may comprise a value 403 indicative of a queue occupancy level and a value 402 indicative of a suggested drop level according to queue occupancy 403. Drop level value 402 may be selected from a range of values. Optionally, drop level value 402 is selected from a group consisting of low, medium and high. In some embodiments of the present disclosure, the indication message is sent to the originating AP using a reliable network protocol, for example Transmission Control Protocol (TCP). In addition, the indication message is optionally sent using a secure network protocol, for example Secure Sockets Layer (SSL). Optionally, flow identification 401 is a 32-bit binary number. Optionally, flow identification 401 is a result of a hash function applied to the one or more data flow parameters identifying the data flow for which AP 102 detected a degradation in the QoS level. Optionally, queue occupancy 403 is a 24-bit binary number, and drop level value 402 is an 8-bit binary number.

Reference is now made again to FIG. 2. Upon receiving the message indicative of the detected degradation, in 215 originating AP 101 optionally adapts in 215 a bandwidth allocated to at least one of the plurality of data flows sent from AP 101 to AP 102. Optionally, AP 101 adapts the bandwidth allocated to the data flow for which AP 102 detected a degradation in the QoS level. Optionally, HGW AP 101 receives from the plurality of supported APs (e.g., AP 102 and AP 103) at least two messages, wherein each message is indicative of a degradation of a QoS level provided by a supported AP device from the plurality of the supported APs, in response to the at least two messages, the HGW AP 101 adapts a bandwidth allocated to at least one of the plurality of data flows according to the message indicative of the highest drop level value 402. Optionally, AP 101 maintains a plurality of queues, each queue for one of the plurality of data flows sent from AP 101 to AP 102. Optionally, AP 101 classifies each of the plurality of data flows according to some of the data flow's data flow parameters. For example, AP 101 may classify each of the plurality of data flows according to the data flow's priority level according to IEEE 802.1p signaling standard or according to the data flow's access category according to IEEE 802.11e QoS enhancements standard. Optionally, AP 101 allocates bandwidth to at least one data flow of the plurality of data flows according the at least one data flow's classification.

Optionally, AP 101 adapts the bandwidth by adapting the management of the plurality of queues according to data extracted from the message indicative of the detected degradation. Optionally, AP 101 assigns a drop level threshold value to each drop level value of the range of values. For example, each drop level threshold value may be a percentage of a maximum amount of packets on a queue or a percentage of a maximum amount of data bytes on a queue. For example, AP 101 may assign a first drop level threshold value of "95% of queue data bytes" to a first drop level value of "low", a second drop level threshold value of "90% of queue data bytes" to a second drop level value of "medium" and a third drop level value of "85% of queue data bytes" to a third drop level threshold value of "high". Optionally, AP 101 tags each of the plurality of data flows with a data flow ID. Optionally, when the message indicative of the detected degradation comprises a certain flow ID and a certain drop level value, AP 101 drops packets of a data flow tagged with the certain drop flow ID when a queue assigned to the data flow reaches an occupancy level exceeding the drop level threshold value assigned to the certain drop level value. For example, when a drop level threshold value of "85% of data bytes" is assigned to drop level "high", AP 101 may drop packets of the data flow when the queue assigned to the data flow reaches an occupancy level exceeding 85% of the queue's capacity to store data bytes. Other examples of a drop level threshold value are a percentage of a maximum amount of packets on a queue, an amount of packets and an amount of data bytes.

Optionally, AP 101 assigns a drop level threshold value to a drop level value according to one or more of a flow ID and an occupancy level value extracted from the message indicative of the detected degradation.

After adapting bandwidth for at least one data flow, AP 101 optionally sends in 221 the plurality of data flows to AP 102, modified according to the adapted bandwidth allocated to the at least one data flow. In some video encoding protocols, a sender of a video stream may mark some data packets of the video stream as droppable, such that losing one or more of the marked packets has limited impact on a user's quality of experience viewing the video stream. When some of the plurality of data flows are a plurality of video streams, AP 101 optionally adapts the bandwidth by dropping a droppable packet. When some of the plurality of data flows are a plurality of video streams, AP 101 optionally adapts the bandwidth by dropping one or more data packets composing a complete video frame.

Optionally, AP 102 forwards the modified plurality of data flows to client 105 in 225 and optionally continues to monitor in 226 the QoS level of providing the plurality of modified plurality of data flows to client 105. Optionally, AP 102 detects in 227 an improvement in the QoS level, for example by detecting a queue occupancy level below a low watermark occupancy level. In 230 AP 102 optionally sends AP 101 another message indicative of the detected improvement and in 235 AP 101 optionally again adapts the bandwidth of the at least one data flow, for example by refraining from dropping packets of the at least one data flow.

In embodiments comprising a cascade of APs, network congestion may be detected by any AP in the cascade of APs, in which case the message indicative of the detected degradation may be sent from one AP to the originating AP via an additional AP.

Figure 4:
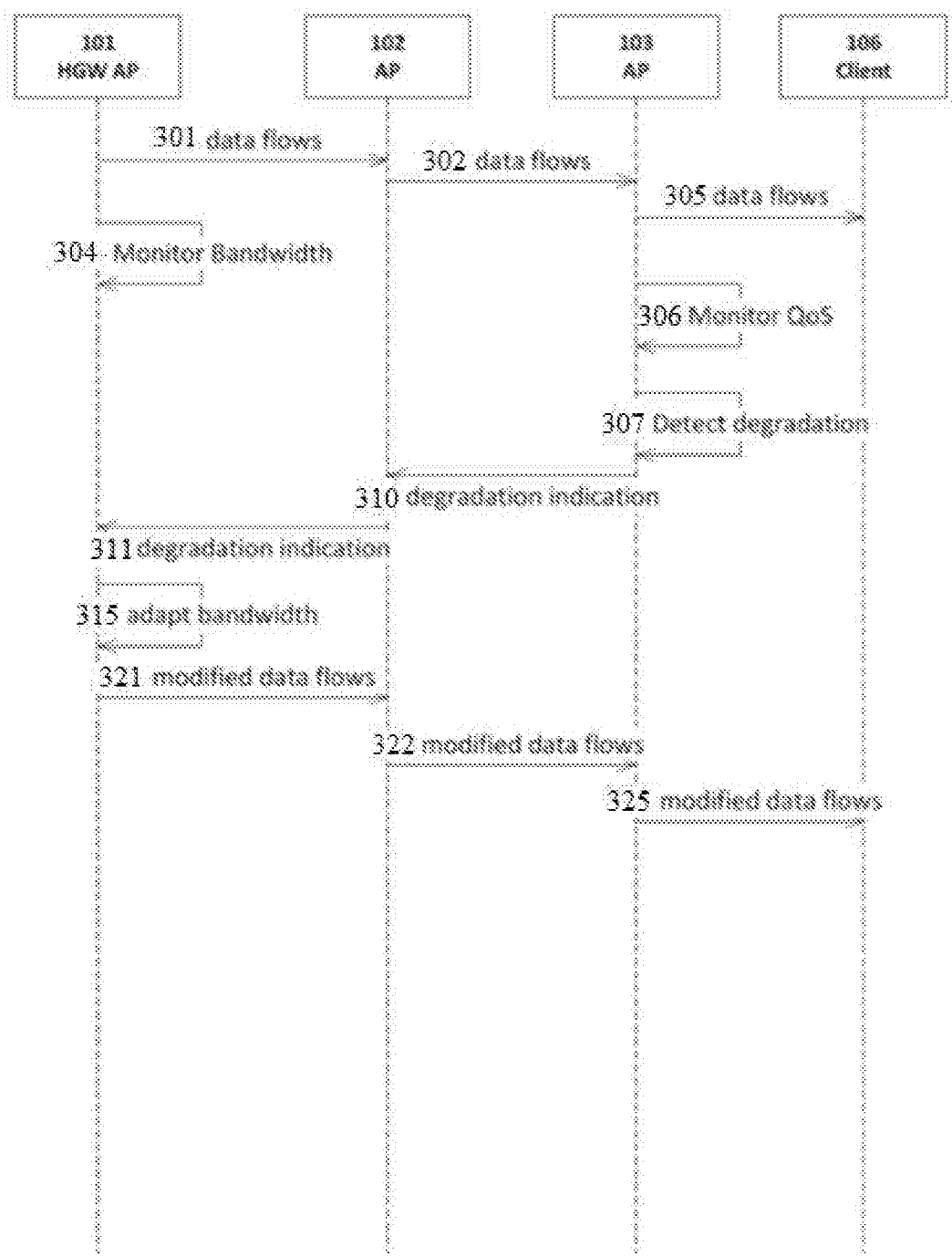
FIG. 4 is a sequence diagram of another optional flow of operations, according to some embodiments of the present disclosure.

Reference is now made also to FIG. 4, showing a sequence diagram of another optional flow of operations 300 with regards to a cascade of APs, according to some embodiments of the present disclosure. In such embodiments, the plurality of data flows sent in 301 from AP 101 are destined to client 106, connected to AP 103, thus AP 102 forwards in 302 the plurality of data flows to AP 103 for the purpose of forwarding to client 106 in 305. Upon detection of a QoS level degradation, AP 103 optionally sends in 310 to AP 102 a message indicative of the detected degradation destined to AP 101, and in 311 AP 102 optionally forwards the message to AP 101. The modified plurality of data flows according to the adapted bandwidth are optionally sent in 321 by AP 101 to AP 102, in 322 AP 102 optionally forwards the modified plurality of data flows to AP 103 to be optionally directed in 325 by AP 103 to client 106.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant QoS level indications will be developed and the scope of the term QoS level is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have disclosed all the possible subranges as well as individual numerical values within that range. For example, description of a range such as from 1 to 6 should be considered to have disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub combination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was further and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. An access point (AP) device, comprising:
a memory configured to store instructions; and
a controller coupled to the memory, wherein the instructions cause the controller to be configured to:
monitor bandwidth allocated by the AP device to a plurality of data flows directed to a plurality of wireless clients, wherein the plurality of wireless clients comprises a plurality of supported APs;
receive, from each supported AP of at least two APs of the plurality of supported APs, a message; and
adapt, in response to the message, a first bandwidth allocated to a first data flow from among the plurality of data flows and which is forwarded to a supported AP, wherein adapting the first bandwidth comprises:
receiving, from the plurality of supported APs, at least two messages, wherein each message of the at least two messages indicates a degradation of a quality of service (QoS) level of a respective supported AP from the plurality of the supported APs and comprises a drop level value selected from a range of values; and
in response to receiving the at least two messages, adapting the first bandwidth allocated to the first data flow according to one message of the at least two messages that indicates a highest drop level value.

2. The AP device of claim 1, wherein the AP device is a home gateway (HGW) AP.

3. The AP device of claim 1, wherein the instructions further cause the controller to be configured to identify each of the plurality of data flows according to at least one of the following parameters: a source Internet Protocol (IP) address, a destination IP address, a source port, a destination port, or a protocol.

4. The AP device of claim 3, wherein the instructions further cause the controller to be configured to:
perform a classification of each of the plurality of data flows according to the parameters; and
allocate the first bandwidth to the first data flow according to a corresponding classification.

5. The AP device of claim 1, wherein the instructions further cause the controller to be configured to:
maintain a plurality of queues for the plurality of data flows in a one-to-one manner;
extract data from the message; and
adapt a management of the plurality of queues according to the data.

6. The AP device of claim 1, wherein the message comprises a drop level indication indicating the drop level value that is selected from a range of values, and wherein the instructions further cause the controller to be configured to adapt the first bandwidth based on the drop level indication.

7. The AP device of claim 6, wherein the instructions further cause the controller to be configured to:
assign a drop level threshold value to each drop level value of the range of values, and
adapt the first bandwidth based on the drop level threshold value.

8. The AP device of claim 1, wherein the plurality of data flows is a plurality of video streams.

9. The AP device of claim 8, wherein the first data flow comprises one or more droppable packets, and wherein the one or more droppable packets is a complete video frame.

10. The AP device of claim 1, wherein the instructions further cause the controller to be configured to tag each of the plurality of data flows with a flow identifier (ID).

11. A method of allocating bandwidth to a plurality of data flows directed to a plurality of wireless clients comprising a plurality of supported access points (AP) device, wherein the method is implemented by an AP device, and wherein the method comprises:
- monitoring bandwidth allocated by the AP device to the plurality of data flows;
- receiving, from each supported AP of at least two APs of the plurality of supported APs, a message; and
- adapting, in response to the message, a first bandwidth allocated to a first data flow from among the plurality of data flows and which is forwarded to a supported AP, wherein adapting the first bandwidth comprises:
  - receiving, from the plurality of supported APs, at least two messages, wherein each message of the at least two messages indicates a degradation of a quality of service (QoS) level at a respective supported AP from the plurality of the supported APs and comprises a drop level value selected from a range of values; and
  - in response to receiving the at least two messages, adapting the first bandwidth allocated to the first data flow according to one message of the at least two messages that indicates a highest drop level value.

12. The method of claim 11, wherein the AP device is a home gateway (HGW) AP.

13. The method of claim 11, further comprising identifying each of the plurality of data flows according to some of the following parameters, a source Internet Protocol (IP) address, a destination IP address, a source port, a destination port, or a protocol.

14. The method of claim 13, further comprising:
- performing a classification of each of the plurality of data flows according to the parameters; and
- allocating the first bandwidth to the first data flow according to a corresponding classification.

15. The method of claim 11, further comprising:
- maintaining a plurality of queues for the plurality of data flows in a one to one manner; and
- adapting a management of the plurality of queues according to data extracted from the message.

16. The method of claim 11, wherein the message comprises a drop level indication indicating the drop level value that is selected from a range of values, and wherein the method further comprises adapting the first bandwidth based on the drop level indication.

17. The method of claim 11, further comprising tagging each of the plurality of data flows with a flow identifier (ID).

18. An access point (AP) device, comprising:
- a memory configured to store instructions; and
- a controller coupled to the memory, wherein the instructions cause the controller to be configured to:
  - receive, from an originating AP device, a plurality of data flows directed to a plurality of wireless clients, wherein the plurality of wireless clients comprises a plurality of supported APs;
  - monitor, for each of the plurality of data flows, a quality of service (QoS) level of providing the plurality of data flows to one of the plurality of wireless clients supported APs by the AP device;
  - detect a degradation in a first QoS level allocated to the plurality of data flows; and
  - forward, to the originating AP in response to the degradation, a message to allow the originating AP to adapt a bandwidth allocated to plurality of the data flows in response to the message, wherein adapting the bandwidth comprises:
    - receiving, from the plurality of supported APs, at least two messages, wherein each message of the at least two messages indicates a degradation of a quality of service (QoS) level at a respective supported AP from the plurality of the supported APs and comprises a drop level value selected from a range of values; and
    - in response to receiving the at least two messages, adapting the bandwidth allocated to at least one data flow among the plurality of data flows according to one message of the at least two messages that indicates a highest drop level value.

19. The AP device of claim 18, wherein the instructions further cause the controller to be configured to monitor a queue occupancy level of each of the plurality of data flows in a plurality of queues to monitor the first QoS level.

20. A computer program product comprising computer-executable instructions for storage on a non-transitory computer-readable medium that, when executed by a processor, cause a computer to:
- monitor bandwidth allocated by an access point (AP) device to a plurality of data flows directed to a plurality of wireless clients, wherein the plurality of wireless clients comprise a plurality of supported APs;
- receive, from each supported AP of the plurality of supported APs, a message; and
- adapt, in response to the message, a first bandwidth allocated to a first data flow from among the plurality of data flows and which is forwarded to the supported AP device, wherein adapting the first bandwidth comprises:
  - receiving, from the plurality of supported APs, at least two messages, wherein each message of the at least two messages indicates a degradation of a quality of service (QoS) level at a respective supported AP from the plurality of the supported APs and comprises a drop level value selected from a range of values; and
  - in response to receiving the at least two messages, adapting the first bandwidth allocated to the first data flow according to one message of the at least two messages that indicates a highest drop level value.

* * * * *